May 29, 1923.
F. W. ROLLER
MEASURING INSTRUMENT
Filed Oct. 22, 1920
1,456,517
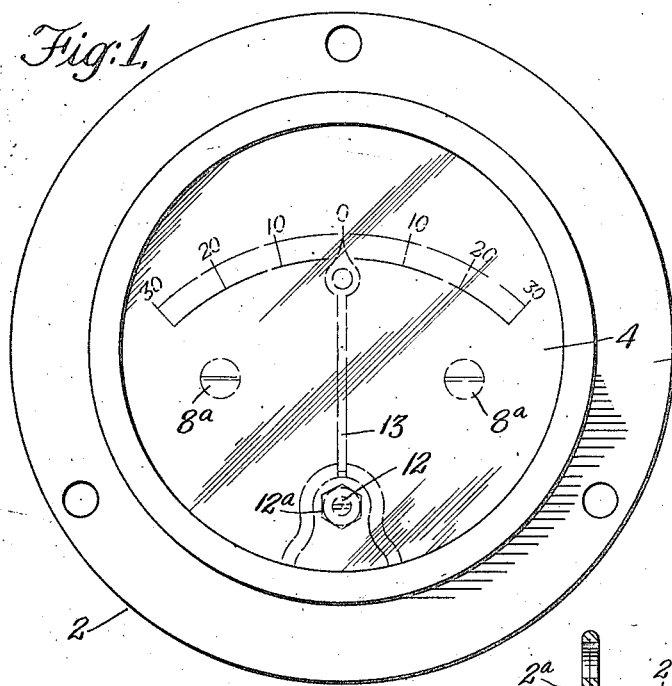
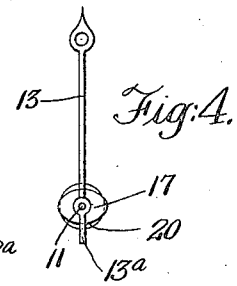
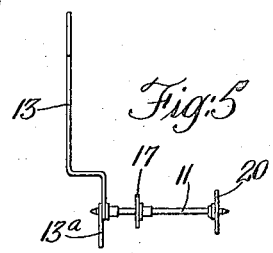
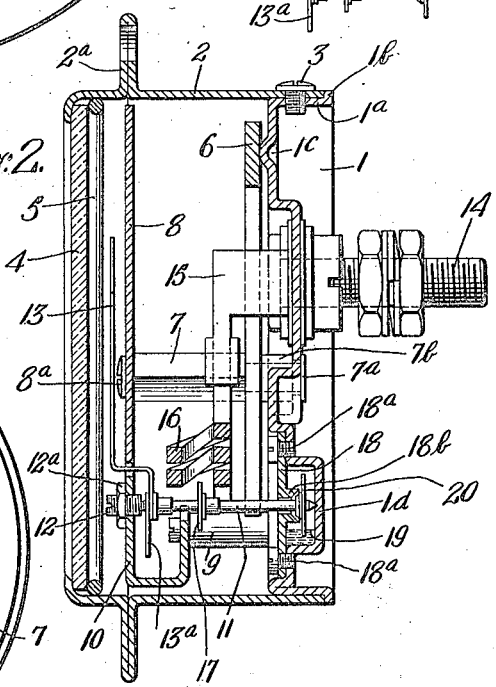
Inventor
Frank W. Roller
By his Attorneys
Edwards, Sager & Bower Patented May 29, 1923.

1,456,517

UNITED STATES PATENT OFFICE.

FRANK W. ROLLER, OF EAST ORANGE, NEW JERSEY, ASSIGNOR TO ROLLER-SMITH COMPANY, A CORPORATION OF NEW YORK.

MEASURING INSTRUMENT.

Application filed October 22, 1920. Serial No. 418,653.

*To all whom it may concern:*

Be it known that I, FRANK W. ROLLER, a citizen of the United States, residing at East Orange, in the county of Essex and State of New Jersey, have invented certain new and useful Improvements in Measuring Instruments, of which the following is a specification.

This invention relates to measuring instruments such as ammeters, volt-meters and the like, wherein a movable element is deflected varying amounts depending upon the quantity measured.

The principal object of the invention is to produce an improved damping means in combination with such instruments. One feature of my improved damping means is the securing of an efficient damping action. I utilize a liquid damping means and by my invention, I so relate the parts that the buoyancy effect produced by the liquid on the movable element or movable system of the instrument remains unchanged for all deflected positions of the movable parts for a given position of the instrument; and no matter in what position the instrument is placed the buoyancy effect remains the same for all the different deflected positions. Also the buoyancy effect is always equal on the two sides of the pivot of the movable system, giving at all times a balanced effect. I furthermore preferably so construct the damping means that the immersion in the damping liquid will be the same for all deflected positions of the movable element or movable system of the instrument for any position of the instrument.

My improved instrument not only has an effective damping action, but by the above features the scale divisions are not affected in their uniformity by the damping means. Variable factors of the damping means which might cause errors in the indications of the instrument are thus avoided.

Another object of the invention is to produce an instrument of small size and relatively large capacity; another is to reduce the number of elements to a minimum and to so relate them as to secure a simple construction, the parts of which may be economically manufactured and conveniently assembled. Another object is to produce an instrument of this character which shall be durable.

The particular type of instrument disclosed herein is an ammeter and is of the form in which a magnetic element is mounted on the staff of the instrument and held in zero position by the magnetic field between the poles of a permanent magnet; but various features of my invention are applicable to other types and forms of instruments and are capable of embodiment in various forms of construction.

My invention and its various advantages will be understood by those skilled in the art from the following description and accompanying drawings which illustrate one embodiment of my invention.

Fig. 1 is a front elevation; Fig. 2 is a vertical cross section; Fig. 3 is a front elevation with the cover and scale plate of the instrument removed; Fig. 4 is a front view of the movable element; and Fig. 5 is a side view thereof.

The back of the casing is formed by a sheet metal plate 1 which supports the elements of the instrument and is pressed into such form as to co-operate with the elements carried thereby. This rear plate is shown circular in form and has a rearwardly extending flange $1^a$ and an outwardly extending rim or edge $1^b$. The cover or enclosing casing 2 of the instrument is also formed of sheet metal and fits over flange $1^a$ and is secured thereto by screws 3. The casing has an outwardly extending rim $2^a$ formed as shown, by which the instrument may be supported upon the panel in which it is to be mounted. The casing has an inwardly extending front edge against which is set a glass plate 4, retained in position by a ring 5.

The permanent magnet 6, of a generally circular form and having poles $6^a$, is placed parallel to and near the rear plate of the instrument being supported at its upper portion by an indented part $1^c$ of the rear plate and at its lower portion by a pair of posts 7, the inner ends of which pass through the magnet and have a threaded engagement with tubes $7^a$ fixed to the back plate. The spacing washers $7^b$ are located between the back plate and rear faces of the permanent magnet for positioning the latter a short distance in the front of the rear plate. The front ends of the posts 7 receive and support the scale plate 8, being secured thereto by screws $8^a$ which engage the posts 7.

Fixed to the rear plate 1 at the lower portion thereof, is a pair of posts 9 which support at their front ends a sheet metal strip 10 which forms a support for an adjustable bearing for the staff 11. The sheet metal strip 10 extends downwardly from the posts 9 and is then bent to extend forwardly and again bent to extend upwardly. The front upper portion of the strip carries a screw 12 having a threaded engagement with the plate 10 and adjustable therein, the inner end of the screw forming a bearing for the movable element. The nut 12ª locks the screw 12 in any adjusted position.

The staff 11 of the movable element is journaled at its rear end in a depressed portion of the back plate 1, as shown in Fig. 2. The needle 13 of the instrument is bent at right angles at its lower portion and passes through the central space between the scale plate and the supporting plate 10 and is fixed at its lower end to the staff 11, the part 13ª forming the counter weight for the needle.

The terminals 14 of the instrument extend through and are insulated from and are supported by the rear plate 1. At the inner ends of the terminals leads 15 extend toward each other and also parallel to each other. Supported by these leads and electrically connected therewith is the deflecting coil 16 of the instrument. In this instance the coil as shown, is formed of a bare copper strip having two turns and supported in the position shown by connection with the leads 15. The coil is in front of the poles of the permanent magnet and just above the staff 11 of the movable element.

The magnetic element 17 is fixed to the staff 11 and located approximately opposite the axis of the coil 16. The magnetic element as shown is a disc of eliptical shape. When no current is passing through the deflecting coil, the movable element will assume a position in the line of the magnetic flux between the poles 6ª. In the position shown the element 17 is subjected only to a weak or stray field of the permanent magnet. In normal position the needle 13 assumes the zero or central position on the scale plate in this instance.

When current passes through the deflecting coil 16 in one direction, the deflecting field will deflect the magnetic element 17 and needle in one direction in proportion to the current flowing; and when current passes through the coil in the opposite direction it will similarly cause the magnetic element 17 and needle to be deflected in the opposite direction from its central zero position.

The damping means is provided by forming a circular depressed portion 1ᵈ in the back plate of the instrument to form a chamber. This is covered by a circular cover plate 18 which forms a tight joint with the plate 1 and is secured in place by screws 18ª. There is thus formed a well or container for the liquid 19, the level of which may be approximately that shown in Fig. 2. The cover plate 18 has an inwardly extending tubular portion 18ᵇ through which the staff 11 passes. With this construction the liquid 19 is always retained within the well, no matter in what position the instrument may be placed.

On the staff 11 is fixed a disc 20 located within the chamber containing the liquid and at the rear end of the tube 18ᵇ. The disc 20 has the lower portion thereof extending down into the liquid 19. Thus upon any movement of the movable element of the instrument, the disc turns in its own plane and the lower portion or rim of the disc passes through the liquid 19.

The damping liquid should have a sufficiently high viscosity to efficiently dampen the movable element by the passage of the disc 20 through the liquid. I have found that watch-makers oil is quite desirable for this purpose. It has sufficiently high viscosity and is appreciatively unaffected by change of temperature and is substantially free from evaporation. It is apparent even though the instrument be used in a horizontal position, vertical, or any other position, the disc 20 will at all times be partially or wholly immersed in the liquid and thus effectively dampen the instrument in any position.

It is evident that in any position of the instrument, the buoyancy effect of the liquid remains unchanged in all deflected positions of the movable parts and the buoyancy effect is likewise balanced at all times, because it is always the same on the two sides of the pivot. It is also evident that in every deflected position of the movable element or movable system, the disc 20 is immersed in the damping liquid to the same degree and thus any variable factor due to a change of immersion when the instrument is deflected, is eliminated.

It will be seen by the simplicity of the parts of my improved instrument and their relative positions, that they may be easily manufactured and conveniently assembled; also the parts are so related as to produce a small instrument with a comparatively large capacity and secure a durable and serviceable construction.

Although I have illustrated and described one embodiment of my invention, various modifications may be made without departing from the scope thereof.

I claim:—

1. In a measuring instrument, the combination with the movable element and means for causing the deflection thereof, of a damping liquid, and an auxiliary damping element carried by said movable element and engaging said liquid, said damping element comprising a disk movable in its own plane through said liquid and the periphery of said disk at all points being substantially equi-distant from the axis of said movable element.

2. In a measuring instrument, the combination with the pivoted movable element and means for causing the deflection thereof, of a damping liquid and an auxiliary damping element carried by said movable element and engaging said liquid, said damping element having a balanced buoyancy on the two sides of the pivoted movable element in all deflected positions of the movable element with the instrument in a vertical position and also in all deflected positions of the movable element with the instrument in a horizontal position.

3. In a measuring instrument, the combination with the movable element and means for causing the deflection thereof, of a damping liquid, and an auxiliary damping element carried by said movable element and engaging said liquid, said damping element being movable in its plane and extending to the same depth in said liquid in all deflected positions of the movable element with the instrument in a vertical position.

4. In a measuring instrument, the combination with the movable element and means for causing the deflection thereof, of a damping liquid, and an auxiliary damping element carried by said movable element and engaging said liquid, said damping element being movable in the direction in which its surface extends and engaging said liquid to the same depth in all deflected positions of the movable element with the instrument in a vertical position.

5. In a measuring instrument, a sheet metal support, a movable device having a shaft carried by said support, means for deflecting said device, and damping means for the movable device, said damping means comprising a container formed by a depression in said support, a damping liquid in said container, and a damping element carried by said shaft in said container and engaging said liquid, said damping element being movable in the direction in which its surface extends.

6. In an electrical measuring instrument, a support, a movable device having a shaft carried by said support, means for deflecting said device carried by said support, said support having a depression to form a container, a liquid in said container, the shaft of said device having a bearing in the wall of said depressed portion, and a vane on said shaft engaging the liquid in said container and movable in its own plane.

FRANK W. ROLLER.